United States Patent [19]
Shono

[11] 3,770,088
[45] Nov. 6, 1973

[54] FRICTION-ENGAGING DEVICE
[75] Inventor: Kinji Shono, Wakoh, Japan
[73] Assignee: Nissan Motor Co., Ltd., Kanagawa-ku, Yokohama, Japan
[22] Filed: Dec. 16, 1971
[21] Appl. No.: 208,561

[30] Foreign Application Priority Data
Dec. 22, 1970 Japan.............................. 45/129341

[52] U.S. Cl. ........................... 192/70.27, 192/89 B
[51] Int. Cl. ............................................. F16d 13/44
[58] Field of Search ........................ 192/70.27, 89 B

[56] References Cited
UNITED STATES PATENTS
| | | | |
|---|---|---|---|
| 2,630,897 | 3/1953 | Porter | 192/89 B |
| 2,700,444 | 1/1955 | Ahlen | 192/89 B |

*Primary Examiner*—Allan D. Herrmann
*Attorney*—Robert E. Burns et al.

[57] ABSTRACT

Herein disclosed is a friction-engaging device such as a friction clutch for motor vehicle power transmission systems, having a flywheel which is made up of main and subsidiary driving plates which are rotatable together, a pressure plate axially movable between the main and subsidiary driving plates through cooperation of spring and clutch release means, and a friction-engaging plate engageable on their opposite faces with the pressure plate and the subsidiary driving plate and secured to a clutch hub which is axially slidable on a transmission input shaft. The friction-engaging plate can be disengaged from the subsidiary driving plate completely and immediately when the clutch release means is so actuated.

4 Claims, 1 Drawing Figure

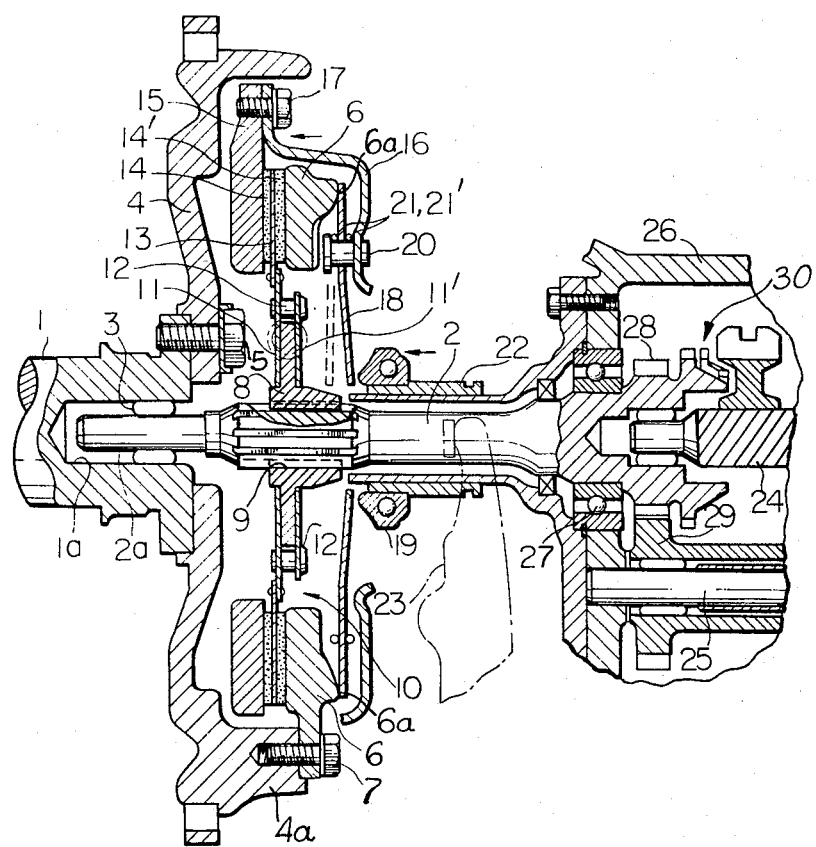

FRICTION-ENGAGING DEVICE

This invention relates to friction-engaging devices and has particular reference to friction clutches of the dry-disc type having a friction-engaging plate which can be clamped between a driving member and a pressure plate which is axially movable relative to the driving member. The friction-engaging device or the friction clutch herein disclosed is specifically adapted for use in a motor vehicle power transmission system of the counter-shaft type in which power delivered from an engine crankshaft is selectively transmitted to main and counterdrive shafts through engagement of the friction-engaging device or clutch.

The friction clutches as usually employed in the motor vehicle power transmission systems generally use a flywheel rotatable with the engine crankshaft and a pressure plate drivingly connected to the flywheel so as to frictionally engage a driven element with the flywheel for transmitting drive torque from the engine crankshaft to a transmission input shaft of the transmission system. The driven element is usually a friction-engaging plate secured to a clutch hub which is splined to the transmission input shaft and is friction-engageable with a back face of the flywheel and a front face of the pressure plate. The pressure plate is biased to a position in which the friction-engaging plate is held in friction engagement with the flywheel. When a clutch pedal for the transmission system is depressed, the pressure plate is retracted from the friction-engaging plate by means of a suitable clutch release mechanism so that the friction-engaging plate is disengaged from the flywheel, thereby interrupting the delivery of the power through the clutch. It is, in this instance, important that, when the pressure plate is released from the friction-engaging plate, the friction-engaging plate be completely free from contact with the flywheel so that no drive torque is transmitted to the input shaft of the transmission system.

Where the friction clutches of the construction above outlined are incorporated in the power transmission systems of the counter-shaft type, a difficulty sometimes arises in that streamlined slinding engagement between the transmission input shaft and the clutch hub supporting the friction-engaging plate is impaired especially after the clutches have been used for an extended period of time. This causes the friction-engaging plate to fail to immediately and completely withdraw from the flywheel so that the transmission of the power through the clutch is continued even when the clutch pedal is in a depressed condition. Various attempts have thus far been made to eliminate the difficulty of this nature, none of such attempts having proved completely successful, however.

The power transmission system of the counter-shaft type has a main drive gear formed at an end of the input shaft and a counter gear formed on the counter shaft and in constant mesh with the main drive gear. The main drive gear is usually a left-hand helical gear while the counter gear is a right-hand helical gear. When, therefore, the transmission system is shifted from idling to forward drive condition, an axial thrust is imparted to the input shaft by reason of a tendency for continuous action along the helices of mating teeth of the two helical gears. This thrust acts on the input shaft, which consequently is moved toward the engine crankshaft. If, in this condition, the input shaft fails to freely slide on the clutch hub to which it is splined, then the friction-engaging plate supported by the hub tends to move toward the flywheel. Rotation of the flywheel is thus objectionably transmitted to the friction-engaging plate and accordingly to the input shaft even though the pressure plate is held in its retracted position.

When, thus, the clutch is dis-engaged and the transmission system is shifted to the forward drive condition from idling so that the motor vehicle is ready to start, a synchronizer of the transmission system is inoperable to have the main drive shaft properly synchronized with the input shaft and, as a result, the shifting operation in the transmission system can not be accomplished in a streamlined and reliable fashion. Granting, in this instance, that the synchronizer is capable of operating in a satisfactory condition, it will still happen that the motor vehicle is driven forward in an unforeseen unusual condition or that the engine stops accidentally.

These problems will be solved if the helical main drive and counter gears of the transmission system are substituted for usual spur gears so that no axial thrust is imparted to the transmission input shaft. The use of the spur gears, however, creates other important problems such as the degraded durability and generation of noises and, as such, are not practically acceptable.

The problem of the improper or retarded disengagement of the clutch can also be solved if the directions of the helix angles of the helical gears are inversed, viz., if the main drive gear is a right-hand helical gear and the counter gear is a left-hand helical gear. In this instance, the axial thrust resulting from the rotation of the helical gears is imparted to the input shaft in a reversed direction, viz., toward the main drive shaft so that difficulties are now encountered in how to bear such axial thrust within the power transmission system structure. In order that this axialthrust be borne within the transmission system in a satisfactory condition, the power transmission system of the counter-shaft type presently in common use will require extensive and somewhat drastic changes and modification.

It is, therefore, an important object of this invention to provide an improved friction-engaging device, such as a friction clutch for motor vehicle power transmission systems, which can be completely and reliably disengaged when it is desired to have the transmission of the drive torque interrupted therethrough.

It is another important object of the invention to provide an improved dry-disc friction clutch which is specifically adapted for use in motor vehicle power transmission systems of the counter-shaft type.

It is a further object of the invention to provide an improved dry-disc friction clutch for the counter-shaft power transmission system using usual helical gears for transmitting the drive torque from the input shaft to the counter shaft, which clutch is capable of being disengaged immediately and completely when the clutch pedal for the transmission system is depressed during idling so as to establish forward drive condition.

It is a still further object of the invention to provide an improved dry-disc clutch for the described motor vehicle power transmission systems, wherein the driven member or friction-engaging plate can be disengaged from the engine flywheel completely and immediately when the pressure plate is retracted therefrom even though the friction-engaging plate is moved toward the flywheel due to the deteriorated sliding engagement between the transmission input shaft and the clutch hub splined thereto.

It is a still further object of the invention to provide an improved dry-disc friction clutch for the described motor vehicle power transmission systems in which the synchronizer forming an important part of the power transmission system is operable in a proper condition when the transmission system is shifted from the idling to the forward drive condition.

According to this invention and to accomplish these and other objects, there is provided a friction-engaging device which comprises substantially concentrically aligned, rotatable members including a main driving plate having at least one extension formed at its edge generally in parallel to an axis of rotation of the driving plate, a subsidiary driving plate which is secured at its edge to the above-mentioned extension of the main driving plate, the main and subsidiary driving plates thus having their radial walls spaced apart from each other a distance approximately corresponding to the length of the aforesaid extension, a pressure plate positioned between and spaced apart from the main and subsidiary driving plates, an axially movable cover which is secured at its edge to the pressure plate and which is positioned to contain therein the subsidiary driving plate, and at least one friction-engaging plate which is positioned between and engageable on their opposed sides with the subsidiary driving plate and the pressure plate. The pressure cover and the axially movable plate are movable toward and away from the main driving plate so that the pressure plate is retracted from and pressed against the friction-engaging plate, respectively. Spring means is provided which, when maintained in a neutral condition, biases the axially movable cover away from the subsidiary driving plate for causing the pressure plate to press the friction-engaging plate against the subsidiary driving plate so that the friction-engaging device in its entirety is held in a coupled condition. This condition is interrupted by actuation of clutch release means which is provided in association with the aforesaid spring means. When this clutch release means is actuated to an operative condition, then the spring means is forced to move the axially movable cover toward the subsidiary driving plate and accordingly move the pressure plate away from the friction-engaging plate. The friction-engaging plate is consequently disengaged from the subsidiary driving plate so that the power train through the friction-engaging plate is cut off.

The spring means forming part of the device thus constructed may be a coned disc spring which is attached halfway to the axially movable cover. The coned disc spring is seated at one end on a back face of the subsidiary driving plate and has its opposite end positioned to be engageable with the clutch release means which is above mentioned. When the clutch release means is actuated and brought into engagement with the coned disc spring, then the disc spring is forced toward the friction-engaging plate so that the axially movable cover to which the spring is connected is moved together with the pressure plate toward the main driving plate.

The clutch release means, on the other hand, may comprise a clutch release bearing which is engageable with the aforesaid spring means such as the coned disc spring and which is axially movable toward and away from the friction-engaging plate. When the clutch release bearing is held in a position remote from friction-engaging plate, the same is released from the spring means. The spring means thus assumes a neutral condition. When the clutch release bearing is moved toward the friction-engaging plate and engages with the spring means, then the spring means is forced toward the friction-engaging plate so as to establish the uncoupled condition of the friction-engaging device.

Where the friction-engaging device which is constructed basically in this manner is used as a friction clutch of a motor vehicle power transmission system such as of the counter-shaft type, the main and subsidiary driving plates constitutes, in combination, an engine flywheel and, as such, is rotatable with an engine crankshaft. In this instance, the friction-engaging plate is secured to a clutch hub which is splined or keyed or otherwise axially movably connected to an input shaft of the power transmission system. The clutch release means or, more specifically, the clutch release bearing is axially slidable over the power tranmission input shaft and is operatively connected to a clutch pedal through a suitable mechanical linkage which may include a clutch release fork or withdrawal lever, as customary.

Other features and advantages of the friction-engaging device or, in a most practical form, the dry-disc friction clutch in accordance with this invention will become more apparent from the following detailed description given by way of example with reference to the accompanying drawing which illustrates, in a longitudinal axial section, a motor vehicle power transmission system of the counter-shaft type including the friction clutch according to this invention in a preferred form. Before entering into detailed discussion of the device according to the invention, it is to be noted that the device may be either of the single-disc or multiple-disc type although the same will be herein described and shown as being of the former type.

Referring to the drawing, the friction clutch according to the invention as shown forms part of a motor vehicle power transmission system of the counter-shaft type which includes a crankshaft 1 driven from a motor vehicle engine, not shown, and an input shaft 2 having a pilot end portion 2a extending into an axial bore 1a in the crankshaft 1. The input shaft 2 is rotatable relative to the crankshaft 1 through a pilot bearing 3, as usual. A flywheel 4 as a main driving plate is connected to the crankshaft 1 through a bolt 5 or any other fastening means so as to be rotatable therewith. The flywheel 4 has at its peripheral edge at least one extension 4a which is generally in parallel to the input shaft 2. It is preferable that the extension 4a is provided as three in number though not so shown. A generally annular driving member 6 as a subsidiary driving plate is secured at its edge to the flywheel 4 by means of a bolt or bolts 7. The flywheel 4 and annular driving member 6 are thus rotatable together with the crankshaft 1.

A clutch hub 8 having a radial extension or flange portion, not numbered, is splined as at 9 to the transmission input shaft 2 so as to be axially movable thereon. This clutch hub 8 supports a friction-engaging plate which is generally denoted by reference numeral 10. The friction-engaging plate 10 is usually made up of clutch disc mounts 11 and 11' secured to both faces of the flange portion of the clutch hub 8 by bolts or rivets 12, a clutch disc or cushioning plate 13 radially extending from the clutch disc mount 11, and a pair of clutch friction facings 14 and 14' which are rivetted or bonded to both sides of the cushioning plate 13. The facings 14 and 14' are usually in an annular form and one of them, which may be the facing 14', is so positioned as to be friction-engageable with the annular driving member 6 when the friction-engaging plate 10 is in an operative position which is illustrated.

A pressure plate 15 is located between the flywheel 4 and the friction-engaging plate 10 so as to be friction-engageable with the facing 14 of the friction-engaging plate. The pressure plate 15 is mounted on an axially movable clutch cover 16 through bolts 17, the clutch cover thus containing therein the annular member 6 and the friction-engaging plate 10, as shown. When, thus, the axially movable clutch cover 16 is moved away from the flywheel 4, the pressure plate 15 is forced against the friction facing 14 and accordingly the other facing 14' is pressed upon the annular driving member 6 so that the rotation of the annular driving member 6 is followed by the friction-engaging plate 10 and consequently by the clutch hub 8.

Such axial movement of the clutch cover 16 is effected through cooperation of a coned disc spring 18 and a clutch release bearing 19. The coned disc spring 18 is located to be intermediate between the annular member 6 and a radial wall portion of the clutch cover 16 and secured halfway to the clutch cover through a thrust rivet 20 which is loaded by thrust rings 21 and 21'. This coned disc spring 18 has its outer peripheral edge seated on the back face, shown as backwardly protruded at 6a, of the annular driving member 6 and its inner peripheral edge surrounding the transmission input shaft 2 behind the clutch hub 8, whereby the axially movable clutch cover 16 is biased away from the annular member 6 so that the friction-engaging plate 10 is maintained in friction-engagement with the annular member. The clutch release bearing 19, on the other hand, is located to be engageable with the inner peripheral edge portion of the coned disc spring 18 and is supported on a sleeve 22 which is positioned over the transmission input shaft 2, as shown. This sleeve 22 is axially movable toward and away from the coned disc spring 18 by means of a clutch release fork 23 which is operatively connected to a clutch pedal, not shown. When, thus, the sleeve 22 is held in a position remote from the coned disc spring 18, the clutch release bearing 19 is disengaged from the disc spring, which consequently is maintained in its neutral condition. When, on the contrary, the sleeve 22 is moved by the clutch release fork 23 toward the coned disc spring 19 and the clutch release bearing 18 is brought into abutting engagement with the disc spring, the disc spring is forced toward the flange portion of the clutch hub 8 as indicated by broken lines 80 that the clutch cover 16 and accordingly the pressure plate 15 are moved toward the flywheel 4, thereby causing the friction-engaging plate 10 to be uncoupled from the annular driving member or subsidiary driving plate 6 so as to interrupt the delivery of the power from the flywheel 4 to the transmission input shaft 2.

The transmission input shaft 2 is associated with a main drive shaft 24 which is in line with the input shaft 2 and a counter shaft 25 extending in parallel to the main drive shaft 24. The main drive shaft 24 and counter shaft 25 are accommodated within a transmission housing 26 which rotatably supports the transmission input shaft 2 through a bearing 27. The transmission input shaft 2 has formed at its rear end a main drive gear 28 which is in constant mesh with a counter gear 29 which is formed on the counter shaft 25 as shown. The main drive gear 28, as previously noted, a usual left-hand helical gear while the counter gear 29 is a right-hand helical gear. Designated generally by reference numeral 30 is a synchronizer unit whereby the rotation of the transmission input shaft 2 is transmitted to the main drive shaft 24 in synchronism.

When, thus, the clutch pedal is depressed and consequently the clutch release bearing 19 is caused to press upon the coned disc spring 18 so as to establish the forward drive condition from idling, the friction-engaging plate 10 is permitted to completely and immediately withdraw from the annular driving member 6 as the susidiary driving plate even though the clutch hub 8 fails to freely slide on the transmission input shaft 2 which is urged toward the engine crankshaft 1 by reason of the helix angles of the gears 28 and 29. Improper or retarded disengagement of the clutch as conventionally encountered can be avoided in this manner while, at the same time, the transmission synchronizer does operate in a proper condition.

What is claimed is:

1. A friction-engaging device comprising, substantially concentrically aligned rotatable members including a main driving plate having at least one extension formed at its edge substantially in parallel to an axis of rotation of said main driving plate and a subsidiary driving plate secured at its edge to said extension of the main driving plate, the main and subsidiary driving plates thus having their radial walls spaced apart from each other, a pressure plate positioned between and spaced apart from said main and subsidiary driving plates, an axially movable cover secured at its edge to said pressure plate and positioned to contain therein said subsidiary driving plate, and at least one friction-engaging plate positioned between and engageable on their opposite sides with said subsidiary driving plate and said pressure plate, said pressure plate and said axially movable cover being movable together toward and away from said main driving plate for causing the pressure plate to be retracted from and pressed against said friction-engaging plate respectively; spring means having a neutral position to bias said axially movable cover away from said subsidiary driving plate and release means engageable with said spring means for causing the spring means to be retracted from said neutral position.

2. A friction-engaging device according to claim 1, in which said spring means comprises a coned disc spring located intermediate said subsidiary driving plate and said axially movable plate and secured halfway to said axially movable cover, said coned disc spring having an outer peripheral edge seated on said subsidiary driving plate and an inner peripheral edge positioned to be engageable with said release means.

3. In a power transmission system of the described counter-shaft type, a friction clutch which comprises a fly-wheel rotatable with an engine crankshaft and having at least one extension formed at its edge substantially in parallel to an axis of rotation of said flywheel, an annular driving member secured at its outer edge to said extension of said flywheel, said flywheel and said annular driving member thus having their radial walls spaced apart from each other a distance substantially corresponding to the length of said extension, a clutch hub axially movable on and rotatable with a transmission input shaft extending in line with said crankshaft, a friction-engaging plate secured to and radially extending from said clutch hub, a pressure plate positioned between said flywheel and said friction-engaging plate, an axially movable clutch cover secured at its edge to said pressure plate and containing therein said annular driving member and said friction-engaging plate, said pressure plate and said clutch cover being axially movable together toward and away from said flywheel for respectively causing said pressure plate to be retracted from and pressed upon said friction-engaging plate, said friction-engaging plate having friction facings which are respectively brought into friction engagement with said pressure plate and said annular driving member when said pressure plate is pressed upon said friction-engaging plate, spring means having a neutral position in which said axially movable clutch cover is biased away from said annular driving member, and clutch release means which is engageable with said spring means for causing the spring means to be retracted from said neutral position.

4. A friction clutch according to claim 3, which said spring means comprises a coned disc spring located intermediate between said annular driving member and said clutch cover and secured halfway to a radial wall portion of said clutch cover, said disc spring having an outer peripheral edge seated on said annular driving member and an inner peripheral edge surrounding said transmission input shaft so as to be engaged by said clutch release means when the clutch release means is actuated.

* * * * *